United States Patent
Bergman et al.

(10) Patent No.: US 9,594,384 B2
(45) Date of Patent: Mar. 14, 2017

(54) METHOD OF ASSOCIATING AN HVAC CONTROLLER WITH AN EXTERNAL WEB SERVICE

(75) Inventors: Gabriel A. Bergman, New Brighton, MN (US); Adam Nemcek, Ostrava (CZ)

(73) Assignee: Honeywell International Inc., Morris Plains, NJ (US)

( * ) Notice: Subject to any disclaimer, the term of this patent is extended or adjusted under 35 U.S.C. 154(b) by 1092 days.

(21) Appl. No.: 13/559,470

(22) Filed: Jul. 26, 2012

(65) Prior Publication Data

US 2014/0031991 A1     Jan. 30, 2014

(51) Int. Cl.
   *G06F 15/16*    (2006.01)
   *G05D 23/19*    (2006.01)
   *H04L 29/08*    (2006.01)
   *H04L 29/06*    (2006.01)
   *F24F 11/00*    (2006.01)
   *H04L 12/28*    (2006.01)

(52) U.S. Cl.
   CPC ............ *G05D 23/19* (2013.01); *F24F 11/006* (2013.01); *F24F 11/0034* (2013.01); *G05D 23/1905* (2013.01); *H04L 12/282* (2013.01); *H04L 12/2809* (2013.01); *H04L 12/2827* (2013.01); *H04L 29/06* (2013.01); *H04L 29/08072* (2013.01); *F24F 2011/0064* (2013.01); *F24F 2011/0071* (2013.01)

(58) Field of Classification Search
   CPC .......................... H04L 29/06; H04L 29/08072
   USPC .................. 709/203, 220, 224, 228; 705/412
   See application file for complete search history.

(56) References Cited

U.S. PATENT DOCUMENTS

| | | |
|---|---|---|
| 6,098,893 A | 8/2000 | Berglund et al. |
| 7,152,058 B2 | 12/2006 | Shotton et al. |
| 7,343,226 B2 | 3/2008 | Ehlers et al. |
| 7,434,742 B2 | 10/2008 | Mueller et al. |
| 7,565,225 B2 | 7/2009 | Dushane et al. |
| 7,904,209 B2 | 3/2011 | Podgorny et al. |
| 7,963,454 B2 | 6/2011 | Sullivan et al. |
| 8,010,237 B2 | 8/2011 | Cheung et al. |
| 8,019,567 B2 | 9/2011 | Steinberg et al. |
| 8,024,073 B2 | 9/2011 | Imes et al. |

(Continued)

FOREIGN PATENT DOCUMENTS

| | | |
|---|---|---|
| WO | 0057259 A2 | 9/2000 |
| WO | 0227687 A1 | 4/2002 |
| WO | WO 2012068517 | 5/2012 |

OTHER PUBLICATIONS

"WiFi Protected Setup," 3 pages, Downloaded Feb. 13, 2012. http://www.wi-fi.org/knowledge-center/faqSecurity.

(Continued)

*Primary Examiner* — Khanh Dinh
(74) *Attorney, Agent, or Firm* — Seager, Tufte & Wickhem LLP

(57) ABSTRACT

A wireless thermostat may be associated with a user account of an external web service that may facilitate remote access and/or control of the wireless thermostat. A remote device may be used to access a user's account hosted by the external web service. The wireless thermostat may be identified to the external web service and associated with the user's account by one or more unique identifiers previously delivered to the remote device from the wireless thermostat.

24 Claims, 9 Drawing Sheets

(56) References Cited

U.S. PATENT DOCUMENTS

| | | | |
|---|---|---|---|
| 8,063,775 | B2 | 11/2011 | Reed et al. |
| 8,081,616 | B2 | 12/2011 | Kito |
| 8,099,195 | B2 | 1/2012 | Imes et al. |
| 8,108,076 | B2 | 1/2012 | Imes et al. |
| 8,116,917 | B2* | 2/2012 | Rodgers ............... 700/291 |
| 8,131,506 | B2 | 3/2012 | Steinberg et al. |
| 8,331,544 | B2 | 12/2012 | Kraus et al. |
| 8,392,561 | B1* | 3/2013 | Dyer et al. ............. 709/225 |
| 2005/0055432 | A1* | 3/2005 | Rodgers .................. 709/223 |
| 2005/0194456 | A1* | 9/2005 | Tessier ............... F24F 11/006 236/51 |
| 2006/0283965 | A1 | 12/2006 | Mueller et al. |
| 2007/0114295 | A1 | 5/2007 | Jenkins |
| 2009/0022076 | A1 | 1/2009 | Canpolat et al. |
| 2009/0045263 | A1 | 2/2009 | Mueller et al. |
| 2009/0195349 | A1 | 8/2009 | Frader-Thompson et al. |
| 2009/0259346 | A1 | 10/2009 | Reed et al. |
| 2010/0146071 | A1 | 6/2010 | Comerford et al. |
| 2010/0168924 | A1* | 7/2010 | Tessier ............... F24F 11/006 700/278 |
| 2010/0280667 | A1 | 11/2010 | Steinberg |
| 2010/0289643 | A1 | 11/2010 | Trundle et al. |
| 2010/0302064 | A1* | 12/2010 | Rodgers .................. 340/870.16 |
| 2011/0022190 | A1 | 1/2011 | Hegde et al. |
| 2011/0044208 | A1 | 2/2011 | Yun et al. |
| 2011/0190910 | A1 | 8/2011 | Lombard et al. |
| 2011/0290893 | A1 | 12/2011 | Steinberg |
| 2011/0307103 | A1 | 12/2011 | Cheung et al. |
| 2012/0005590 | A1 | 1/2012 | Lombard et al. |
| 2012/0053739 | A1 | 3/2012 | Brian et al. |
| 2012/0054125 | A1* | 3/2012 | Clifton et al. ............. 705/412 |
| 2012/0065783 | A1 | 3/2012 | Fadell et al. |
| 2012/0065935 | A1 | 3/2012 | Steinberg et al. |
| 2012/0078425 | A1 | 3/2012 | Gardenswartz |
| 2012/0230221 | A1 | 9/2012 | Radhakrishnan et al. |
| 2012/0239221 | A1* | 9/2012 | Mighdoll et al. ......... 700/300 |
| 2012/0278453 | A1 | 11/2012 | Baum et al. |

OTHER PUBLICATIONS

Filtrete, "Wireless Setup Guide: Thermostat for Windows," EnergyHub Inc., 7 pages, Downloaded Feb. 13, 2012. DOC-CTP-TPSG-111024.

Radio Thermostat, "WiFi Setup Guide for iPhone and iPad," Radio Thermostat Company of America, 6 pages, Downloaded Feb. 13, 2012.

Radio Thermostat, "WiFi Setup Guide for Windows XP," Radio Thermostat Company of America, 5 pages, Downloaded Feb. 13, 2012. r1.2.

Wikipedia, "AOSS," Wikimedia Foundation Inc., 2 pages, Printed Feb. 13, 2012. http://en.wikipedia.org/wiki/AOSS.

Wikipedia, "SecureEasySetup," Wikimedia Foundation Inc., 1 page, Printed Feb. 13, 2012. http://en.wikipedia.org/wiki/SecureEasySetup.

Wikipedia, "Wi-Fi Protected Setup," Wikimedia Foundation Inc., 4 pages, Printed Feb. 13, 2012. http://en.wikipedia.org/wiki/Wi-Fi_Protected_Setup.

Wikipedia, "Windows Rally," Wikimedia Foundation Inc., 4 pages, Printed Feb. 13, 2012. http://en.wikipedia.org/wiki/Windows_Connect_Now.

LaMonica, Martin, "Smart thermostat links to cloud for energy savings," 3 pages, printed Apr. 24, 2012. http://news.cnet.com/8031-11128_3-20086261-54/smart-thermost-links-to-cloud-for-ene . . . .

St. John, Jeff., "Smart Gri'd Latest Cloud: Honeywell Cloud-Connected Thermostats," 7 pages, Nov. 3, 2011.

Alarm.com "Keep it cozy," 1 page, printed Apr. 24, 2012.

Alarm.com "Company Information," 1 page, Printed Apr. 24, 2012.

Alarm.com "Alarm.com Cloud Services May Yield Smartest Thermostats on the planet," 2 pages, printed Apr. 24, 2012. http://www.alarm.com/about/media/MediaGeneric.aspx?cmid=39.

Castle, Steven., "Ready for Thermostat Wars?", 3 pages, May 8, 2012. http://greentechadvocates.com/2012/03/08/ready-for-thermostat-wars/.

Ditosti, Carole, "Alarm.com Cloud Service May Prove to be Smartest Thermostat to Date," 2 pages, Feb. 29, 2012. http://www.alarm.com/about/media/MediaGeneric.aspx?cmid=41.

"Earth Networks and EnergyHub Debut e5 Home Energy Demand Response Program Based on Neighborhood-LEvel, Real-Time Weather," EnergyHub, 2 pages, Jan. 24, 2012. http://www.energyhub.com/news/earth-networks-and-energyhub-debut-e5-home-energy-d . . . .

"How to control your thermostat from anywhere without breaking the bank," Sync(TM) Blog, 2 pages, printed Apr. 27, 2012. http://www.sync-blog.com/sync/2012/01/how-to-control-your-thermostat-from-anywhere- . . . .

Jacobson, Julie, "Xfinity Expands Home Automation with Ecofactor Cloud-Based Enabled Thermostats," 4 pages, Mar. 5, 2012. http://www.cepro.com/article/print/xfinity_expands_home_automation_with_ecofactor_cl . . . .

Mozer, Michael C., "The Neural Network House: An Environment that Adapts to its Inhabitants," Department of Computer Science and Institute of Cognitive Science University of Colorado, 5 pages, 1998.

Edina Realty, "Warranties," 3 pages, before 2014.

Xytronix Research & Design, Inc., "X-300 User's Manual, Revision 1.2" 89 pages, Jul. 30, 2009. [To Be Sent by Mail].

Nexia, "Trane Remote Temperature Monitoring," 2 pages, printed Mar. 25, 2013. www.nexiahome.com/products.productdetail.aspx?model=043156179510.

* cited by examiner

METHOD OF ASSOCIATING AN HVAC CONTROLLER WITH AN EXTERNAL WEB SERVICE

CROSS-REFERENCE TO RELATED APPLICATIONS

This application is related to application Ser. No. 13/559,443 entitled "HVAC CONTROLLER WITH WIRELESS NETWORK BASED OCCUPANCY DETECTION AND CONTROL" and application Ser. No. 13/559,489 entitled "HVAC CONTROLLER HAVING A NETWORK-BASED SCHEDULING FEATURE", both filed on the same day herewith and both incorporated herein by reference in their entireties for all purposes.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, it may be desirable for a user to be able to affect the operation of an HVAC system from a remote location relative to the HVAC controller using an external web service.

SUMMARY

The present disclosure pertains generally to HVAC systems, and more particularly to HVAC controllers that accommodate and/or facilitate control of an HVAC system from a remote location relative to the HVAC controller using an external web service. In one illustrative embodiment, an HVAC controller such as a wireless thermostat may be associated with a user account of an external web service. This may be accomplished by, for example, forming a first wireless network between the wireless thermostat and a device separate from the wireless thermostat. In some cases, the first wireless network may be hosted by the wireless thermostat. The device separate from the wireless thermostat may have a user interface. In some cases, the device that is separate from the wireless thermostat may receive one or more access parameters from a user via the user interface. The one or more access parameters may be used by the wireless thermostat to access a second wireless network, such as a WiFi network. For example, the one or more access parameters may include an SSID, a passcode and/or other access parameter(s) for the second wireless network. The second wireless network may be capable of communicating with a wide area network (e.g. via a gateway) for accessing the external web service.

Once the one or more access parameters are received by the user interface of the device, the one or more access parameters may be transmitted from the device to the wireless thermostat via the first wireless network. The wireless thermostat may also transmit one or more registration parameters to the device via the first wireless network. The one or more registration parameters may uniquely identify the wireless thermostat. For example, the one or more registration parameters may include a MAC address and/or a CRC Code. The device may be used to access the external web service and to associate the one or more registration parameters received from the wireless thermostat with the user account of the external web service. In some cases, the one or more registration parameters may be encoded in a hyperlink that, when selected via the user interface of the device, links to the external web service and passes the one or more registration parameters of the wireless thermostat to the external web service.

The wireless thermostat may be connected to the second wireless network using, at least in part, the one or more access parameters, thereby making the wireless thermostat available on the second wireless network and the wide area network via a gateway. Once available on the wide area network, the wireless thermostat may be automatically associated with the particular user account of the external web service.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
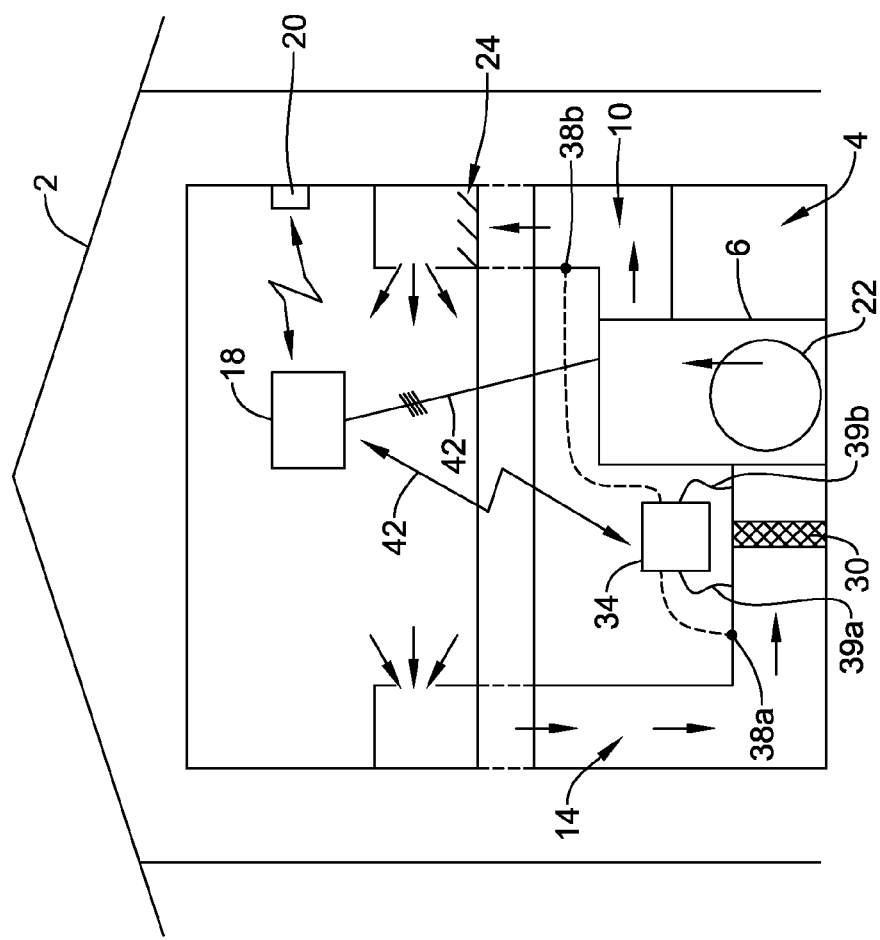
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
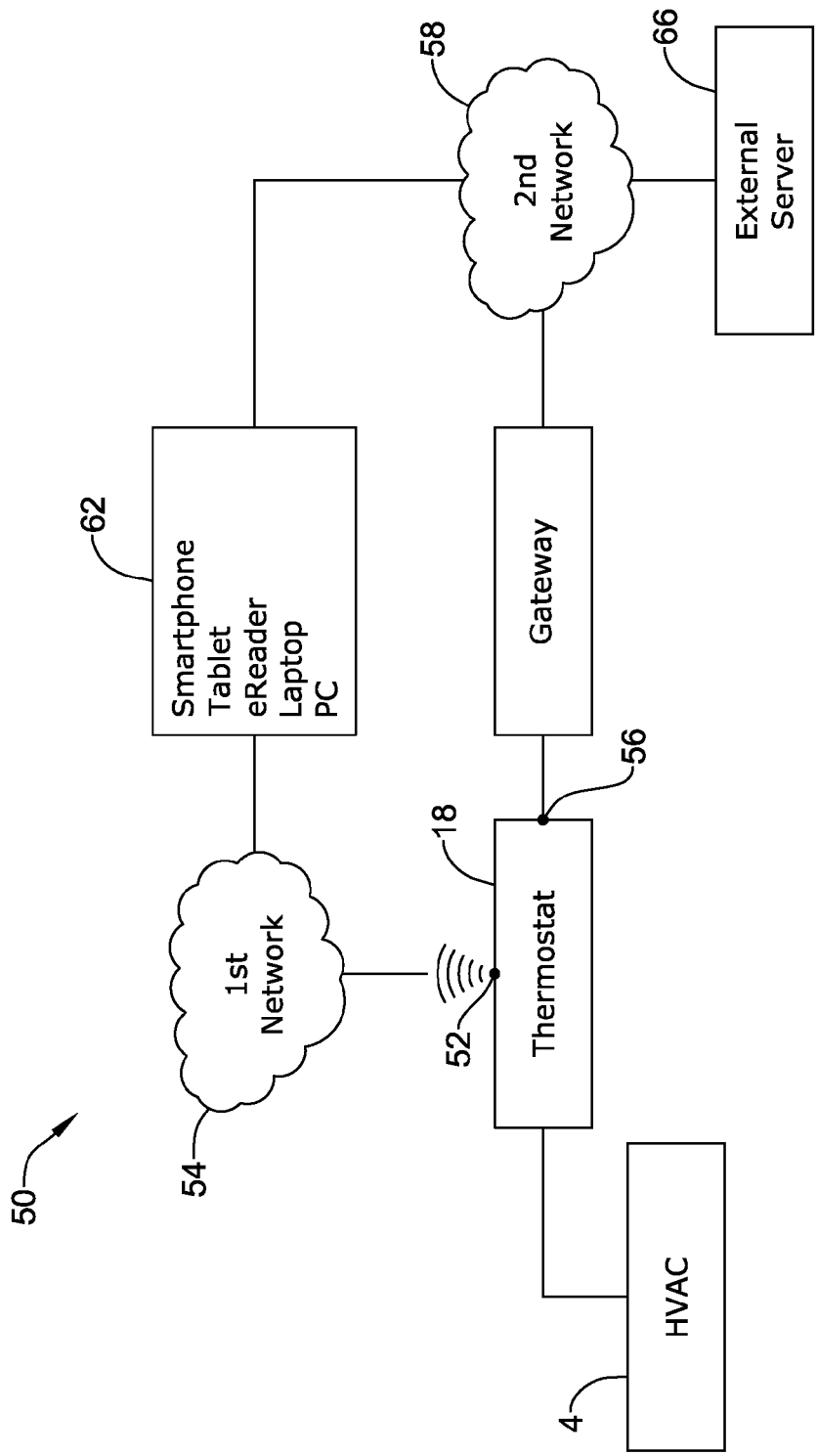
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a cell phone, tablet, reader, laptop computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

Depending upon the application and/or where the HVAC user is located, remote access and/or control of the HVAC controller 18 may be provided over the first network 54 and/or the second network 58. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, wireless network-enabled key fobs, e-Readers and the like.

In many cases, the mobile wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service hosted by one or more external web servers 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
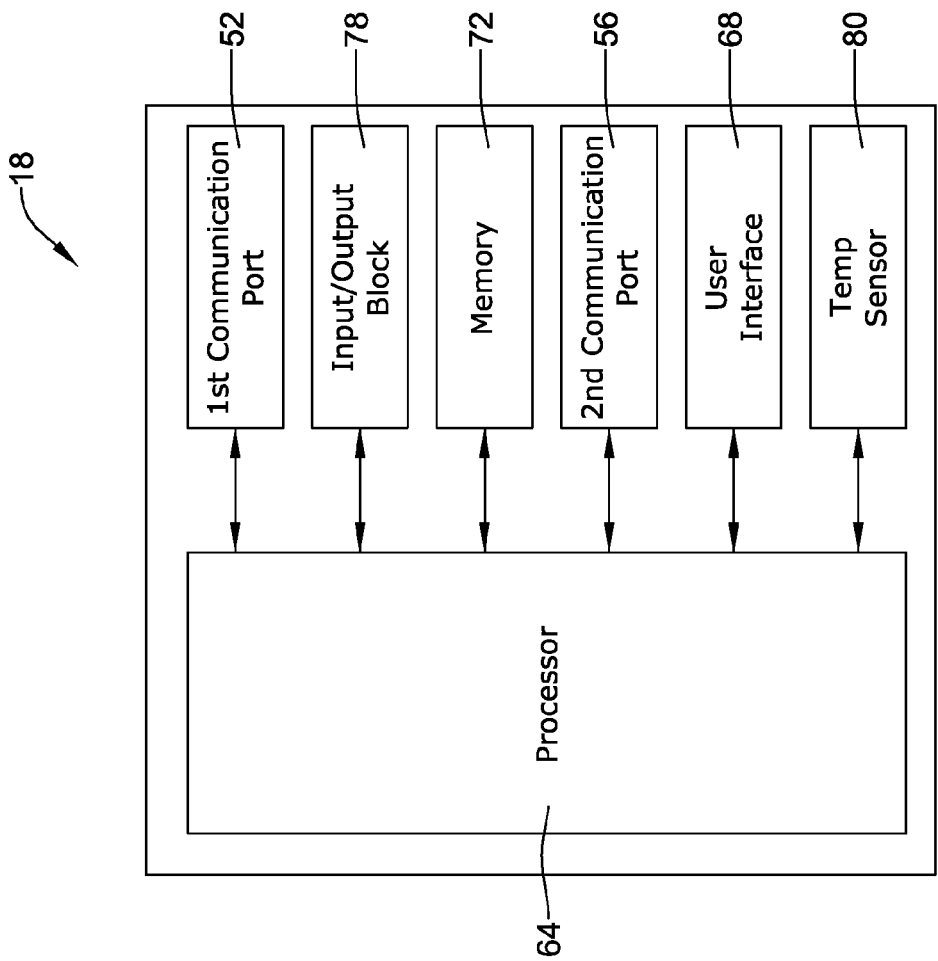
FIG. 3 is a schematic block diagram of an illustrative HVAC controller.

FIG. 3 is a schematic view of an illustrative HVAC controller 18 that may be accessed and/or controlled from a remote location over the first network 54 and/or the second network 58 (FIG. 2) using a mobile wireless device 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIGS. 2 and 3, the HVAC controller 18 may include a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device such as one of those devices 62 previously described herein. In some cases, the virtual user interface 68 may include one or more web pages that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the second network 58 (e.g. WAN or the Internet) by an external web server (e.g. web server 66). The one or more web pages forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number or wired or wireless devices, including the HVAC controller 18 and a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the network 54 each time the device is connected to the wireless local area network 54 and/or wireless network 58.

Figure 4:
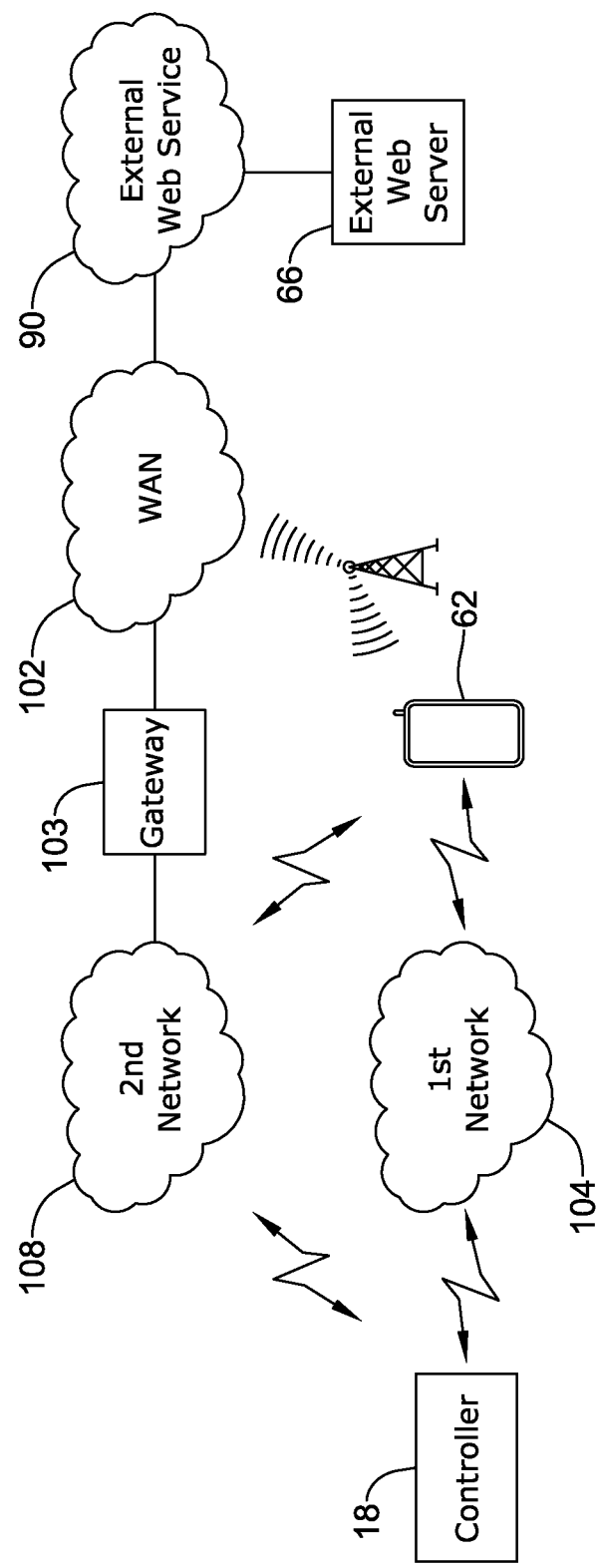
FIG. 4 is a schematic diagram of an HVAC controller in communication with a remote wireless device and an external web service.

FIG. 4 is a schematic diagram of an HVAC controller 18 in communication with a remote wireless device 62 and an external web service 90 hosted by an external web server 66 through a wide area network 102. In some cases, the HVAC controller 18 may be programmed to configure itself as a wireless access point for hosting its own wireless network upon initial installation of the HVAC controller 18 within a building or structure, and may be programmed to accept a wireless connection with a remote wireless device 62. The remote wireless device 62 may be any one of the wireless devices described herein. In some cases, the remote wireless device 62 may be programmed to execute an application code that may cause the wireless device 62 to search for available wireless networks within and/or in close proximity to the building or structure in which the HVAC controller 18 is located. Since the HVAC controller 18 may be initially configured as a wireless access point, the application code may cause the wireless device 62 to detect the wireless network hosted at the HVAC controller 18, and to display the HVAC controller's wireless network on the user interface of the wireless device 62 as being available for connection. The HVAC controller's wireless network may be displayed as one selectable option among a list of other wireless networks available for connection. A user may initiate connection to the HVAC controller's wireless network by selecting of the HVAC controller's wireless network from the list of wireless network's available for connection displayed on the user interface of the remote wireless device 62.

A first wireless network 104 may be established between the HVAC controller 18 and a wireless device 62 upon acceptance of the connection from the remote wireless device 62. Additionally, the HVAC controller 18 may be configured to connect to a second wireless network 108. In some cases, the first wireless network 104 and the second wireless network 108 are both WiFi wireless networks. In other cases, the first wireless network 104 may be a blue tooth wireless network and the second wireless network 108 may be a WiFi wireless network. In still other cases, the first wireless network 104 may be a ZigBee wireless network and the second wireless network 108 may be a WiFi wireless network. These are just some examples. It is contemplated that the first network 104 and the second network 108 may be any suitable network, as desired.

In many cases, the second wireless network 108 may be capable of communicating over a wide area network 102 via a router or gateway 103 for accessing an external web service 90 hosted by an external web server 66. The external web service 90 may include a user account having one or more user profiles that may be associated with the HVAC controller 18. The external web service 90 may provide additional functionalities and or programming capabilities that may not otherwise be available at the HVAC controller 18, or through the user interface of the remote device 62. Additionally, the external web service may be programmed to receive selected data from the HVAC controller 18 over the wide area network 102 via the second wireless network 108 and/or WAN 102. When provided, the data received from the HVAC controller 18 may be analyzed to determine a user's energy usage trends, determine a performance of the HVAC system, detect and/or predict occupancy of the building, and/or perform any other suitable analysis as desired.

In some cases, the HVAC controller 18 may be programmed to receive one or more access parameters for accessing the second wireless network 108 over the first wireless network 104 from the user's wireless device 62. In some cases, the second wireless network 108 may be a wireless local area network of the building or structure in which the HVAC controller 18 is installed. The one or more access parameters may include a service set identifier (SSID) for the second wireless network 108 and/or passcode required to gain access to the second wireless network 108. In some cases, the one or more access parameters for accessing the second wireless network 108 may have been previously entered by a user through the user interface of the user's wireless device 62, and may be stored in the memory of the wireless device 62. For example, in some cases, the user's wireless device 62 may be configured to execute an application program (e.g. app) that solicits and accepts via the user interface of the device 62 one or more access parameters for accessing the second wireless network 108. The application program may be provided by and downloaded from the external web service 90 for this purpose, but this is not required. This may be performed by a user when connecting their wireless device 62 to the building's wireless local area network (second wireless network 108). As such, the user's wireless device 62 may already store the one or more access parameters for the second wireless network 108, which may then be passed to the HVAC controller 18 when the wireless device 62 is connected to the HVAC controller 18 via the first wireless network 104.

In some cases, upon connection of the wireless device 62 to the HVAC controller 18 via the first wireless network 104, the HVAC controller 18 may be configured to implement a web server for serving up one or more web pages over the first wireless network 104 that may be displayed and viewed on the user interface of the wireless device 62. The one or more web pages displayed on the user interface of the wireless device 62 may solicit and accept the one or more access parameters for accessing the second wireless network 108 from a user.

Once the one or more access parameters are provided to the HVAC controller 18 via the first wireless network 104, the HVAC controller 18 may be programmed to use, at least in part, the one or more access parameters to connect to the second wireless network 108. In some cases, the HVAC controller 18 may be programmed to connect to the second wireless network 108 as a network client device using the one or more access parameters received from the user's wireless device 62, making the HVAC controller 18 available on the second network 108. In some cases, the HVAC controller 18 may be programmed to first disconnect itself from the first wireless network 104 established between the HVAC controller 18 and the user's wireless device 62 before connecting to the second wireless network 108 as a network client. For example, and in some cases, the HVAC controller 18 may be programmed to perform a reset, and on initialization, may automatically connect to the second wireless network 108 using the one or more access parameters.

In some cases, before connecting to the second network 108, the HVAC controller 18 may be further programmed to transmit one or more registration parameters over the first wireless network 104 to the user's wireless device 62. The one or more registration parameters may be stored in the memory 72 of the HVAC controller 18 and may be used to uniquely identify the HVAC controller 18 to the external web service 90. In some cases, the one or more registration parameters are pre-loaded into the memory 72 of the HVAC controller at the factory. The one or more registration parameters may include, for example, a Media Access Control address (MAC address) and/or cyclic redundancy check code (CRC code) of the HVAC controller 18. These are just examples. The one or more registration parameters may be received by the user's wireless device 62 and stored in the device memory for later use. In some cases, the one or more registration parameters may be embedded or encoded in a hyperlink that may be delivered from the HVAC controller 18 to the user's wireless device 62 over the first network 104. The hyperlink may be provided on a web page served up by the HVAC controller on the first network 104 and that is viewable on the user interface of the user's wireless device 62. The hyperlink may be available for selection by a user through the user interface of the wireless device 62 such that the hyperlink, when selected by a user, may link to the external web service 90. In response, the external web service 90 may display a web page on the user interface of the wireless device 62 prompting the user to enter a user login and password to gain access to a user account hosted by the external web service 90. Upon successful login in to the user account, the external web service 90 may associate the one or more registration parameters received from the wireless device 62 with the user account.

Rather than embedding the one or more registration parameters in a hyperlink, in some cases, the user's wireless device 62 may be programmed to automatically receives the one or more registration parameters from the HVAC controller 18 when the wireless device 62 is connected to the HVAC controller 18, and to provide the one or more registration parameters to the external web service 90. In some cases, this functionality may be provided by an application program (e.g. app) that is downloaded from the external web service 90 for this purpose, but this is not required. In other cases, the application program may be available for download from another web service such as, for example, Apple's iTunes or Google's App Store. In any event, upon login to a user account of the external web service 90, the application program may automatically transmit the one or more registration parameters to the external web service 90. In some cases, the external web service 90 may use the one or more registration parameters to associate a particular HVAC controller with a particular user's account, and in some cases, may be used to differentiate between two or more HVAC controllers that are associated with a single user account.

In some cases, the wireless device 62 may be further programmed to provide a geographical location of the HVAC controller 18 to the external web service 90. In one example, the same application program that causes the wireless device 62 to transmit the one or more registration parameters that uniquely identify the HVAC controller 18 to the external web service 90 may also cause the wireless device 62 to transmit geographical location information identifying the geographical location of the HVAC controller to the external web service 90. When so provided, the external web service 90 may receive the location data associated HVAC controller 18 and associate the location data with the user's account. In some cases, it may be possible to have two HVAC controllers located in two different geographical locations (e.g. home and cabin) associated with a single user account. The external web service 90 may be configured to differentiate between the two or more HVAC controllers 18 associated with a single user account through the one or more registration parameters and the geographical location associated with each of the different thermostats.

Figure 5:
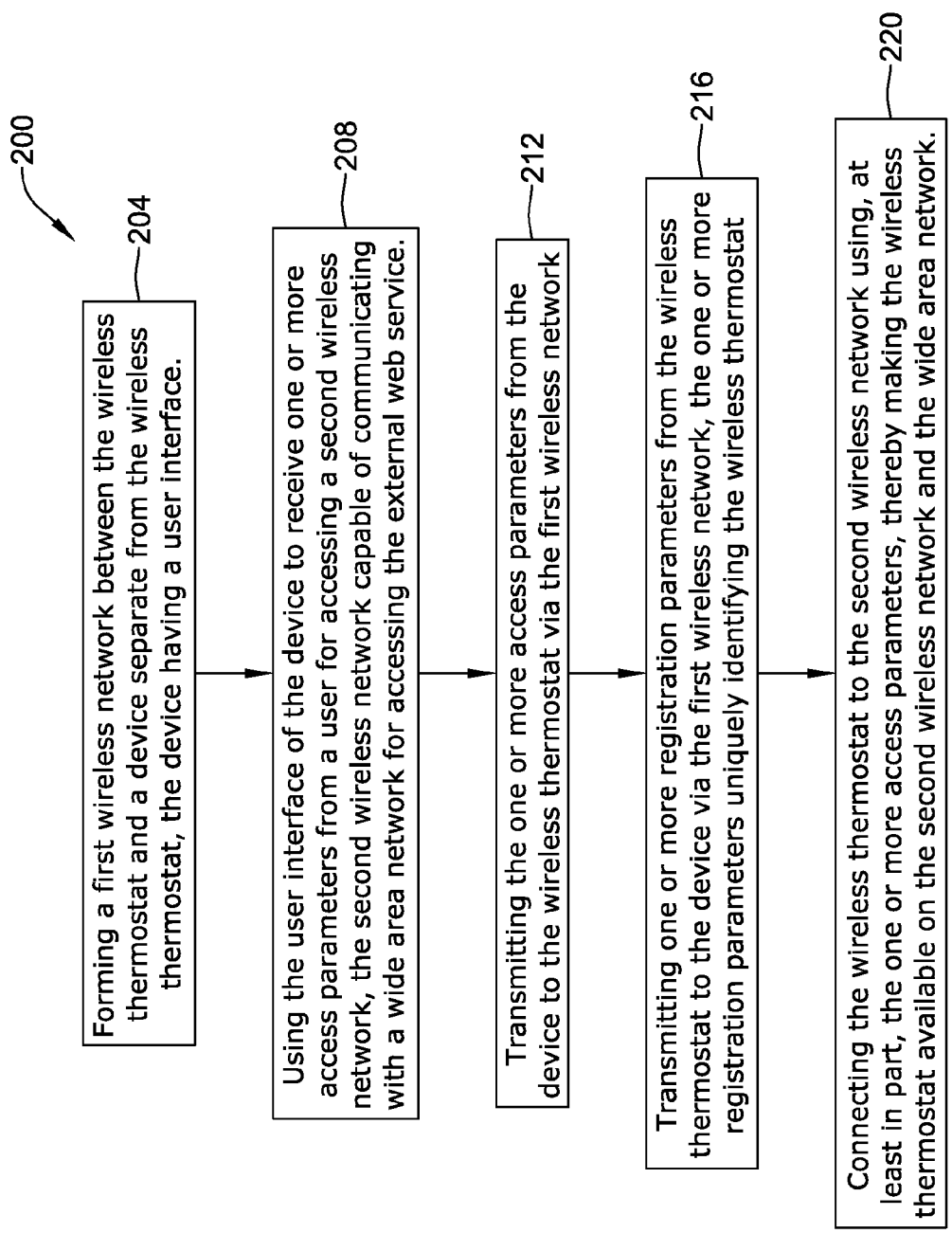
FIG. 5 is a flow chart of a method of associating an HVAC controller with an external web service.
Figure 6:
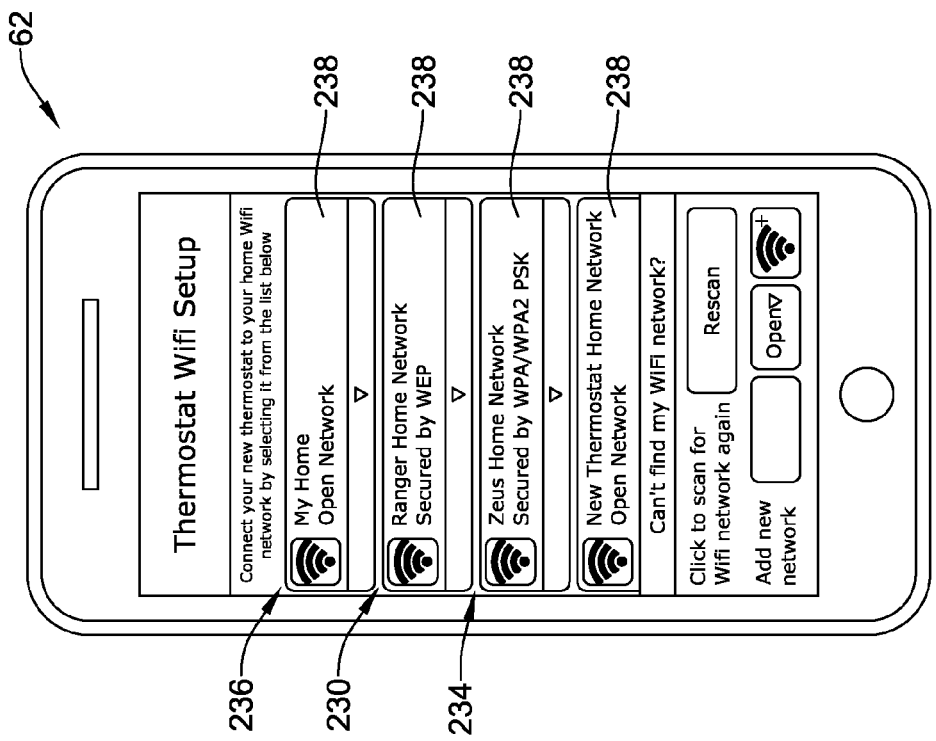
FIGS. 6-9 show illustrative screens that may be displayed on the user interface of a wireless device when associating an HVAC controller with an external web service.

FIG. 5 is a flow chart of a method 200 of associating an HVAC controller 18 with a user account hosted by an external web service. FIGS. 6-9 provide exemplary screens that may be displayed on the user interface of a user's device 62 such as, for example, a user's smartphone (e.g. iPhone™) when connecting the HVAC controller 18 to the building's wireless network and associating the HVAC controller 18 with a user's account hosted by the external web service 90. While FIGS. 6-9 show exemplary screens that may be displayed on a user's smart phone, it should be understood that a similar set of screens may be displayed on any remote device having a user interface that may be used to enroll and connect the HVAC controller 18 to a local area network such as, for example, a tablet computer, a personal computer, and/or lap top computer that may be configured for wireless communication over one or more networks. Additionally, in some cases, it may be assumed that the user's smart phone or other remote wireless device 62 is already configured to be connected to and enrolled in the building's local area network prior to carrying out the method generally outlined in FIG. 5 and shown in the illustrative screens of FIGS. 6-9.

In some embodiments, the method includes establishing a first wireless network 104 between the HVAC controller 18 and a wireless device 62 (Block 204). The wireless device 62 may be any of the wireless devices as described herein and may include a user interface capable of accepting user interactions from a user. In some cases, the wireless device 62 may be configured to execute an application program (e.g. app) or other programming that enables the wireless device 62 to scan for available wireless networks that are available for connection, including the wireless network available at the HVAC controller 18. In some cases, an application program may cause the wireless device to display a screen 230 on the user interface 234 of the wireless device 62 that displays a list 236 of wireless networks 238 available for connection, as shown in the illustrative example shown in FIG. 6. In some cases, the list 236 of wireless networks 238 may be generated by the HVAC controller 18 and displaye don the user interface 234 of the wireless device. Each of the networks 238 displayed on the screen 230 may be displayed as individually selectable options available for selection by a user, and in the example shown, are assigned a unique SSID that identifies them to a user. For example, the HVAC controller's may provide an access point wireless network identified as "New Thermostat", "Honeywell Thermostat", or just simply "Wireless Thermostat". The wireless device 62 will attempt to connect to the HVAC controller's wireless network upon selection of the wireless network option 238 labeled "New Thermostat Home Network".

Figure 7:
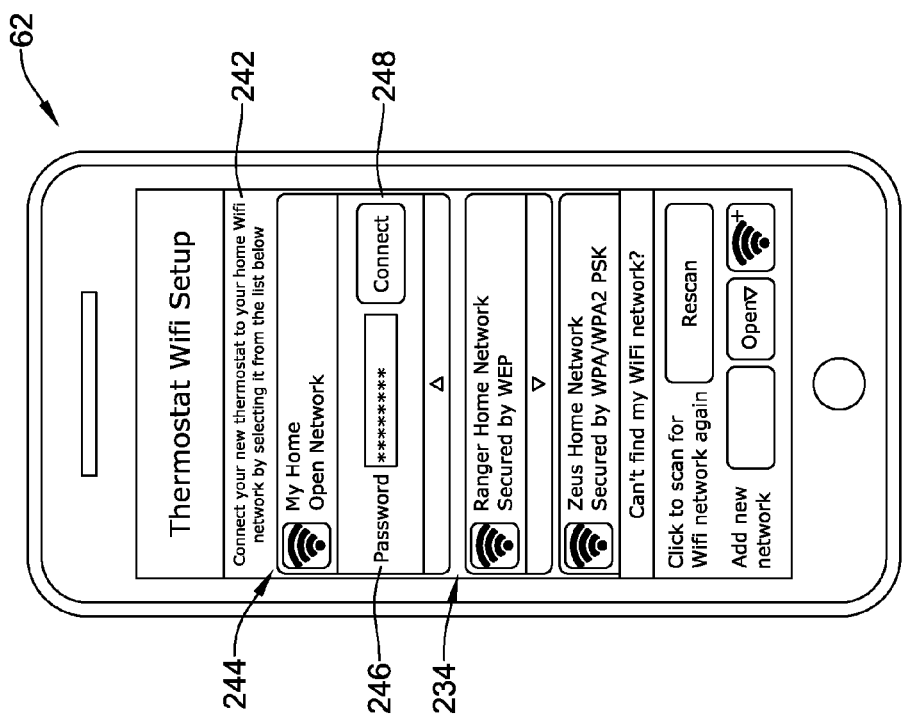

Upon successful connection of the wireless device 62 to the HVAC controller's wireless network, establishing a first wireless network 104 between the wireless device 62 and the HVAC controller 18, the HVAC controller 18 may serve up at least one web page over the first wireless network that may be displayed on the user interface 234 of the wireless device 62 for soliciting information from a user for accessing a second wireless network 108 that may be capable of communicating over a wide area network with an external web service (Block 208). For example, the HVAC controller 18 may serve up a web page 242 over the first wireless network 104 that is displayed on the user interface 234 of the wireless device 62 that may prompt a user to connect to the building's wireless local area network 108. As shown in FIG. 7, the web page 242 may include a user prompt 244 that may prompt a user to take a specific action such as connecting to the building's wireless local area network 108. Additionally, the web page may include a password prompt 246 that may prompt the user to enter a password or passcode associated with the building's wireless local area network 108. Upon entry of the password and selection of the connect button 248 displayed on the web page 242, the wireless device 62 may transmit the SSID and/or password associated with the building's wireless network 108 to the HVAC controller 18 over the first wireless network 104 (Block 212). The wireless device may be programmed to encrypt the SSID and/or password provided by the user before transmitting the SSID and/or password to the HVAC controller 18. The HVAC controller 18 may receive the SSID and/or password associated with the building's wireless network (second wireless network 108) and may use this information, at least in part, to connect to the building's wireless network 108 thereby making the HVAC controller 18 available on the building's wireless network 108 (Block 220 of FIG. 5). In some cases, the HVAC controller 18 may be programmed to decrypt the SSID and/or password, if applicable. Encrypting the SSID and/or password prior to delivery to the HVAC controller 18 over the network protects the building's network credentials. In some cases, because the building's wireless network 108 is capable of communicating over a wide area network with an external web service 90, the HVAC controller 18 may also be available over the wide area network 102 (e.g. via gateway 103).

Figure 8:
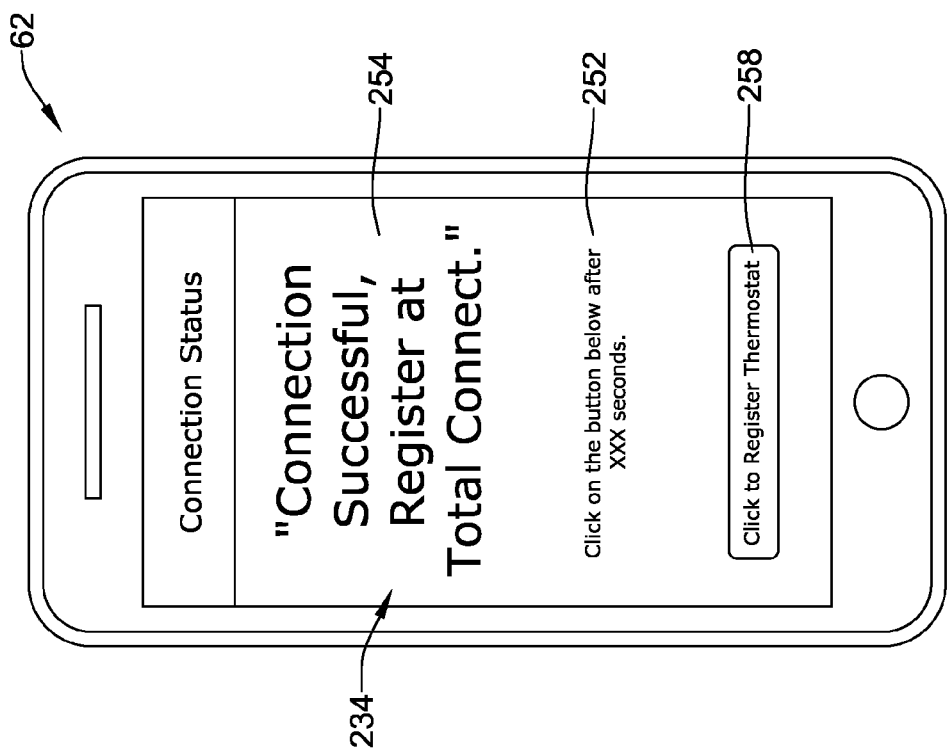

In some cases, the method 200 may include transmitting one or more registration parameters from the HVAC controller 18 to the wireless device 62 over the first wireless network 104 (Block 216 of FIG. 5). The one or more registration parameters may uniquely identify the HVAC controller 18, and, in some cases, may include a MAC address and/or CRC code of the HVAC controller 18. In one case, for example, upon successful connection of the HVAC controller 18 with the wireless device 62 (either via the first wireless network 104 or the second wireless network 108), the HVAC controller may serve up an additional web page 252 that is displayed on the user interface 234 of the wireless device 62, such as in the illustrative example shown in FIG. 8. The additional web page 252 may include a user message 254 that may prompt the user to confirm success of the connection to the building's wireless local area network and that may instruct the user to take a required action. For example, as shown in FIG. 8, the user message 254 states "Connection successful? Register at Total Connect."

In this example, the user message prompts the user to view the user interface of the HVAC controller to visually verify that the HVAC controller 18 has been successfully connected to the building's wireless local area network 108. Additionally, the user message instructs the user to register the HVAC controller 18 with external web service 90 (e.g. Honeywell's TOTAL CONNECT™ web service) if the connection was successful by selecting button or link 258 displayed on the user interface 234 that, upon selection by a user, links to the external web service 90. In some cases, the one or more registration parameters that uniquely identify the HVAC controller 18 may be embedded within the button or link 258. Upon selection of the button or link 258, the one or more registration parameters may be automatically transmitted to the external web service 90 where they may be associated with the user's account hosted by the external web service 90. A second button for or link 260 may be provided for selection by the user if connection of the HVAC controller 18 to the network 108 was not confirmed or the attempt failed. The button or link 260, upon selection by the user, may cause the controller to re-attempt to connect to the network 108.

Figure 9:
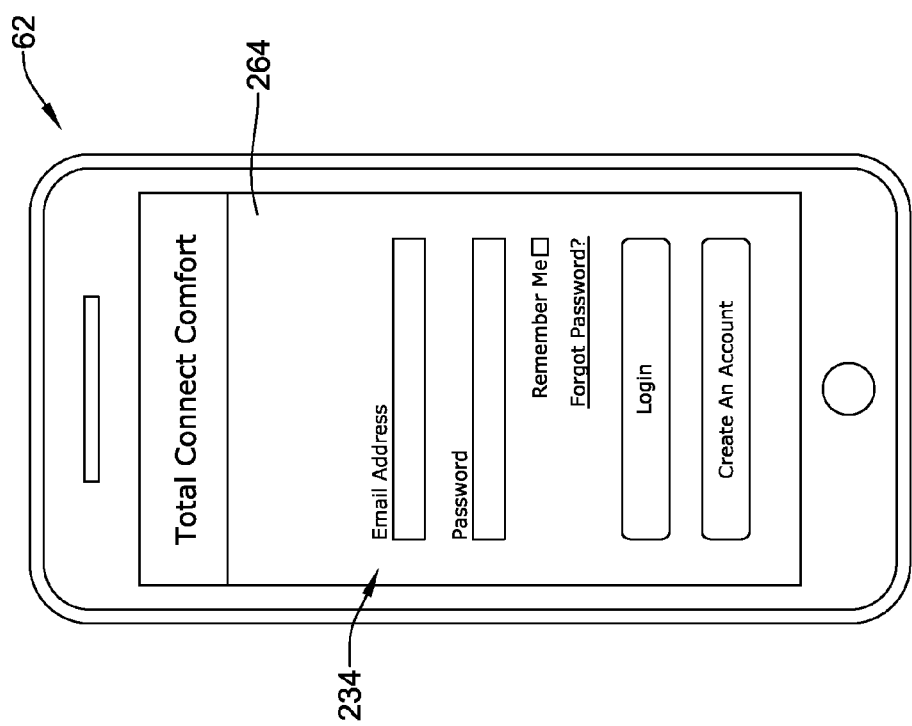

The wireless device 62 may connect to the external web service 90 over the wide area network 102 via the building's wireless network 108 or, in some cases, may connect directly to the web service over the wide area network 102. Upon connection to the external web service 90 over the wide area network 102, the wireless device 62 may display one or more web pages served up by the external web service over the wide area network 102 on the user interface 234 of the wireless device 62. FIG. 9 provides an illustrative example of a web page 264 that may be displayed on the user interface 234 of the wireless device 62 upon selection of the link or button 258 and connection to an external web service 90. In one example, the web page 264 may prompt the user to access a user account by entering a user identification (user id) and password. In another example, the web page 264 may prompt the user to create a user account on the external web service 90. Upon successful login to a new or an existing user account, the external web service 90 may receive the one or more registration parameters from the wireless device 62 for uniquely identifying the HVAC controller 18 and associate the one or more registration parameters identifying the HVAC controller 18 with the user account. Additionally, the external web service 90 may continue to serve up additional web pages that may be displayed on the user interface 234 of the wireless device 62 for facilitating access and/or control of the HVAC controller 18.

Having thus described several illustrative embodiments of the present disclosure, those of skill in the art will readily appreciate that yet other embodiments may be made and used within the scope of the claims hereto attached. Numer- ous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method of associating a wireless thermostat with a user account of an external web service, the method comprising:
    forming a first wireless network between the wireless thermostat and a device separate from the wireless thermostat, the device having a user interface;
    using the user interface of the device to receive one or more access parameters from a user for accessing a second wireless network, the second wireless network capable of communicating with a wide area network for accessing the external web service;
    once the one or more access parameters are received by the user interface of the device, transmitting the one or more access parameters from the device to the wireless thermostat via the first wireless network;
    transmitting one or more registration parameters from the wireless thermostat to the device via the first wireless network, the one or more registration parameters uniquely identifying the wireless thermostat;
    connecting the wireless thermostat to the second wireless network using, at least in part, the one or more access parameters, thereby making the wireless thermostat available on the second wireless network and the wide area network; and
    using the device to access the external web service and to then associate the one or more registration parameters received from the wireless thermostat with the user account of the external web service.

2. The method of claim 1, wherein the device is a wireless device.

3. The method of claim 2, wherein the wireless device is a lap top computer, a tablet computing device, or a smart phone.

4. The method of claim 1, wherein the one or more registration parameters are loaded into the wireless thermostat at the factory.

5. The method of claim 1, wherein the first wireless network and the second wireless network are both WiFi wireless networks.

6. The method of claim 1, wherein the first wireless network is a blue tooth wireless network, and the second wireless network is a WiFi wireless network.

7. The method of claim 1, wherein the first wireless network is a Zigbee wireless network, and the second wireless network is a WiFi wireless network.

8. The method of claim 1, wherein the second wireless network includes an access point that provides communication between the second wireless network and the wide area network.

9. The method of claim 1, wherein the one or more access parameters include a SSID of the second wireless network.

10. The method of claim 1, wherein the one or more access parameters include a passcode for the second wireless network.

11. The method of claim 1, wherein the one or more registration parameters include a MAC ADDRESS and/or CRC code of the wireless thermostat.

12. The method of claim 1, wherein the one or more registration parameters are encoded in a hyperlink that, when selected, links to the external web service.

13. The method of claim 1, wherein the hyperlink is transmitted from the wireless thermostat to the device, and is available for selection on the user interface of the device.

14. The method of claim 1, wherein the one or more registration parameters are received from the wireless thermostat by an application running on the device, and wherein the application provides the one or more received registration parameters to the external web service when accessing the external web service.

15. The method of claim 1, wherein the wireless thermostat disconnects from the first wireless network before connecting the wireless thermostat to the second wireless network.

16. The method of claim 15, further comprising performing a reset on the wireless thermostat before connecting the wireless thermostat to the second wireless network.

17. The method of claim 1, wherein the wireless thermostat provides a web-page to the device across the first wireless network, wherein the web-page accepts the one or more access parameters from the user via the user interface of the device.

18. The method of claim 1, wherein the device executes an application program, and wherein the application program accepts the one or more access parameters from the user via the user interface of the device.

19. A method comprising:
    hosting a wireless network at a wireless thermostat;
    accepting a connection to the wireless network hosted by the wireless thermostat from a remote wireless device;
    the thermostat receiving one or more access parameters associated with a local area network from the wireless device;
    transmitting one or more registration parameters from the wireless thermostat to the remote wireless device for delivery to an external web service, wherein the one or more registration parameters uniquely identify the wireless thermostat;
    the wireless thermostat connecting to the local area network as a client device using the one or more access parameters; and
    the wireless thermostat communicating with an external web service, wherein the wireless thermostat is identified to the external web service by the one or more registration parameters.

20. A wireless thermostat configured to communicate with and control one or more HVAC components, the wireless thermostat comprising:
    a temperature sensor;
    a memory;
    a controller, the controller configured to
        accept a wireless connection with a remote wireless device;
        receive one or more access parameters associated with a local area network from the remote wireless device via the wireless connection;
        transmit one or more registration parameters to the remote wireless device for delivery to an external web service, wherein the one or more registration parameters uniquely identify the wireless thermostat;
        connect to the local area network as a client device using the one or more access parameters received from the remote wireless device; and
        communicate with an external web service at least in part through the local area network, wherein the wireless thermostat is identified to the external web service by the one or more registration parameters previously delivered to the remote wireless device.

21. A computer readable medium having stored thereon in a non-transitory state a program code for use by a wireless device connectable to a local area network, the program code causing the wireless device to execute a method comprising:

scanning for wireless networks using the wireless device, wherein at least one wireless network is hosted by a wireless thermostat;

connecting the wireless device to the wireless network hosted by the wireless thermostat;

receiving from the wireless thermostat one or more unique identifiers that uniquely identify the wireless thermostat via the wireless network hosted by the wireless thermostat;

storing the one or more unique identifiers in a memory of the wireless device;

transmitting one or more access parameters associated with the local area network that are stored in the memory of the wireless device to the wireless thermostat via the wireless network hosted by the wireless thermostat;

connecting the wireless device to an external web service hosted by an external web server; and transmitting the one or more unique identifiers stored in the memory of the wireless device to the external web service.

22. The computer readable medium of claim 21, wherein the external web service associates the one or more unique identifiers of the wireless thermostat with a user account on the external web service.

23. The computer readable medium of claim 21, further comprising transmitting location information identifying a location of the wireless thermostat to the external web service.

24. The computer readable medium of claim 21, wherein the wireless device is a mobile phone, tablet computer, or personal computer configured for wireless communication over one or more wireless networks.

* * * * *